(12) United States Patent
Liao

(10) Patent No.: US 7,185,081 B1
(45) Date of Patent: Feb. 27, 2007

(54) METHOD AND APPARATUS FOR PROGRAMMABLE LEXICAL PACKET CLASSIFIER

(75) Inventor: Heng Liao, Burnbary (CA)

(73) Assignee: PMC-Sierra, Inc. (CA)

( * ) Notice: Subject to any disclaimer, the term of this patent is extended or adjusted under 35 U.S.C. 154(b) by 0 days.

(21) Appl. No.: 09/538,132

(22) Filed: Mar. 29, 2000

Related U.S. Application Data

(60) Provisional application No. 60/131,989, filed on Apr. 30, 1999.

(51) Int. Cl.
G06F 15/173 (2006.01)
G06F 15/16 (2006.01)

(52) U.S. Cl. ............ 709/224; 709/227; 709/228; 709/231

(58) Field of Classification Search ........ 709/230–231, 709/223–228, 238–240, 246–247, 220; 704/10
See application file for complete search history.

(56) References Cited

U.S. PATENT DOCUMENTS

| | | | |
|---|---|---|---|
| 5,365,514 A | | 11/1994 | Hershey et al. ............ 370/17 |
| 5,414,650 A | * | 5/1995 | Hekhuis .................... 708/203 |
| 5,568,471 A | | 10/1996 | Hershey et al. ............ 370/17 |
| 5,704,060 A | * | 12/1997 | Del Monte ............ 707/104.1 |
| 5,822,603 A | | 10/1998 | Hansen et al. ......... 395/800.01 |
| 5,855,015 A | * | 12/1998 | Shoham ..................... 707/5 |
| 5,867,799 A | * | 2/1999 | Lang et al. ................. 707/1 |
| 5,951,674 A | * | 9/1999 | Moreno .................... 712/210 |
| 5,956,721 A | | 9/1999 | Douceur et al. ........... 707/10 |
| 5,960,200 A | * | 9/1999 | Eager et al. ............... 717/147 |
| 6,141,349 A | * | 10/2000 | Ikeda et al. ............... 370/405 |
| 6,172,990 B1 | * | 1/2001 | Deb et al. ................. 370/474 |
| 6,226,680 B1 | * | 5/2001 | Boucher et al. ........... 709/230 |
| 6,266,664 B1 | * | 7/2001 | Russell-Falla et al. ........ 707/5 |
| 6,378,126 B2 | * | 4/2002 | Tang ........................ 717/143 |
| 6,424,934 B2 | * | 7/2002 | Welfeld ..................... 703/25 |
| 6,457,051 B1 | * | 9/2002 | Riddle et al. ............. 709/224 |
| 6,701,338 B2 | * | 3/2004 | Narad et al. .............. 708/525 |

FOREIGN PATENT DOCUMENTS

WO    WO 97/08616    3/1997

* cited by examiner

*Primary Examiner*—Abdullahi Salad
*Assistant Examiner*—Hussein El-chanti
(74) *Attorney, Agent, or Firm*—Townsend and Townsend and Crew LLP

(57) ABSTRACT

A packet classification language (PCL) is provided to specify data packets in a routing device. The PCL uses regular expressions to match incoming data packets. Class identifiers associated with each regular expression identifies the class to which each recognized packet belongs for subsequent processing. A PCL compiler produces a DFA which recognizes the data packets as defined by the regular expressions. A hardware implemented DFA is used to scan the input stream which constitutes the data packets.

50 Claims, 7 Drawing Sheets

METHOD AND APPARATUS FOR PROGRAMMABLE LEXICAL PACKET CLASSIFIER

CROSS-REFERENCES TO RELATED APPLICATIONS

This application claims priority from U.S. Application 60/131,989, filed Apr. 30, 1999 and is herein fully incorporated by reference for all purposes.

BACKGROUND OF THE INVENTION

The present invention is related to network data switches and more particularly to a packet classification method and apparatus therefor.

Modern high performance switches, routers, traffic management devices and other network equipment generally process and transmit digital data that have been formatted into data packets, with each packet having one or more packet headers and packet data. Packet classification is an operation that is common to all packet routing and switching devices. For example, firewall filtering requires packets to be classified so that certain identified packets can be eliminated from the outgoing traffic. Packet classification is necessary to implement policy-based routing. Router access lists require packets to be classified for subsequent routing processing. Packet classification is used to identify different packets for collecting user statistics for performance monitoring and billing purposes.

Typically, packets are constructed according to a layered protocol suite and are encapsulated in a hierarchical structure, with higher layer protocol packets nested within lower layer protocol packets. Decisions regarding how to process a packet are made by examining data in the packet, such as the address and/or the control/data fields of the packet. These packet classifiers can be part of the decision engine that analyzes the protocol encapsulation structure and classifies the packet according to a set of predefined rules.

A standard prior art method of processing packets uses protocol discrimination software to analyze packet protocol structure and to classify a packet according to a set of policies. The protocol discrimination software code usually compares, layer by layer, the key control or data fields of the packet. A decision tree is crafted to direct the processor to the discrimination code for the next layer, when processing of the discrimination code at the previous layer is finished.

The software solutions require a CPU to run at a clock rate that is about an order of magnitude higher than the data receive clock rate in order to adequately process and route incoming packets in real time. The rapid growth in available network bandwidth makes the software approach expensive, impractical, and increasingly difficult to realize.

Hardware-based fixed protocol identifiers and programmable field detectors are capable of operating at much higher clock rates. These techniques inspect data fields in fixed or programmable offset positions in a packet. The fixed protocol identifiers usually recognize encapsulation protocols that are widely used, such as IP (internet protocol), VLAN (IEEE 802.1Q), and SNAP (subnet access protocol) encoded LLC (logical link control). The programmable field detectors allow limited flexibility to support customized classification rules. Since hardware identifiers and detectors can do several data field extractions and comparisons in parallel, these techniques are used to improve the processing speed of the discrimination software.

However, hardware protocol identifiers, even systems enhanced with software control, can only handle a small number of simple classification rules. To provide quality of service (QoS) and fine grain traffic management, future networking applications require packet classifiers capable of handling large numbers of customized policies. These customized policies usually need to match several fixed or variable length data fields in several layers of packet headers with complex dependencies. Moreover, the end user who does not have access to the software code running in the equipment must have some means to modify these policies according to specific application requirements without having to overhaul the software running the equipment.

SUMMARY OF THE INVENTION

The present invention provides a packet classification method and system used in packet routing devices. An incoming packet is classified in accordance with the method and apparatus of the invention. Once classified, the packet routing device can then dispose of the packet in accordance with the classification of the packet. The present invention overcomes limitations in prior art packet processing techniques. The invention reduces rule complexity and hardware costs, while at the same time providing line rate packet processing capability and greatly facilitating the implementation of changing packetizing policies. The packetizing method and system of the present invention can support a larger number of complex classification rules than is possible using conventional techniques.

This invention solves the packet classification problem with combined software and hardware techniques. Its components in specific embodiments include a PCL (Packet Classification Language), a compiler with compression function, and a hardware packet scanner. User policies are coded in PCL, and translated and compressed by the compiler into the hardware packet scanner. The packet scanner decompresses the code image as it scans the input data stream to do packet classification at line rate.

The invention in one aspect adapts lexical token scanning techniques developed for compilers to data communications. In this adaptation, the communication data stream is treated as byte strings to be interpreted and processed by a compiler and packet classes are treated as token sets defined by regular expressions. The invention provides various solutions to the issues involved in building a hardware token scanner for network traffic classification.

Regular expressions are widely used to specify regular sets, or lexical tokens. Well-known techniques have been developed to translate regular expressions into NFAs (Non-deterministic Finite Automata) that recognize the lexical tokens defined by the expressions. Also, there are sub-set construction algorithms that reduce the NFA into a DFA (Deterministic Finite Automaton) with minimum number of states. According to one embodiment of the invention, these techniques are employed by the PCL compiler. A DFA has a number of states. The states consist of intermediate states and terminating states. Each terminating state denotes one lexical token. The DFA token scanning process starts from the beginning state. At each step, the DFA accepts one input character, according to the current state and the input character, the DFA follows the out going arc to the next state in the DFA. This process is repeated until the DFA reaches a terminating state. The label of the terminating states indicates a match is found with a regular expression. Therefore, when reaching a terminating state, the token scanner ends the scanning process and produces a classification result.

Assuming the DFA scans one byte (8 bits) of data at a time, the DFA can be represented by a two dimensional matrix of 256 columns and N rows, where N is the number of states of the DFA. This matrix is referred to as a transition matrix which defines the DFA. A lookup to the transition matrix needs to be done for each scanning step, therefore the matrix needs to be stored in high speed internal or external RAM in a hardware implementation. The size of the transition matrix grows linearly with the number of DFA states. When the number of states grows large, the size of the matrix quickly exceeds the economic size of current internal or external RAM. Since the transition matrix is sparse with many repetitive elements, a compression algorithm can be employed to produce a compressed DFA, thus reducing the storage size of the transition matrix. The hardware cost of the token scanner scales with the compression ratio achieved. Another advantageous feature is a decompression algorithm that is capable of sustaining the input data rate, and yet is easy to implement in hardware. The reason this last element is advantageous is that for each input character, a transition matrix decompression and lookup operation must be performed.

Instead of using the hardware to compare individual data fields and software to follow the dependency in the user rules, hardware DFAs (deterministic finite automata) are used to scan the input data stream. A regular expression based language is used to define the user classification rules. Therefore, this architecture can support a larger number of complex lexical rules than was possible to do using prior techniques. In one embodiment, a compiler is used to translate the user rules into the compressed DFA transition table.

In another aspect of the invention, dual-ported memories are used to represent the DFA. Two classification logic units are provided to realize an increase in packet classification throughput.

The following sections give further details on the PCL, compiler, compression/decompression algorithms, and hardware packet classifier architecture according to various specific embodiments of the invention.

DESCRIPTION OF THE SPECIFIC EMBODIMENTS

A. Packet Classification Language

Figure 1:
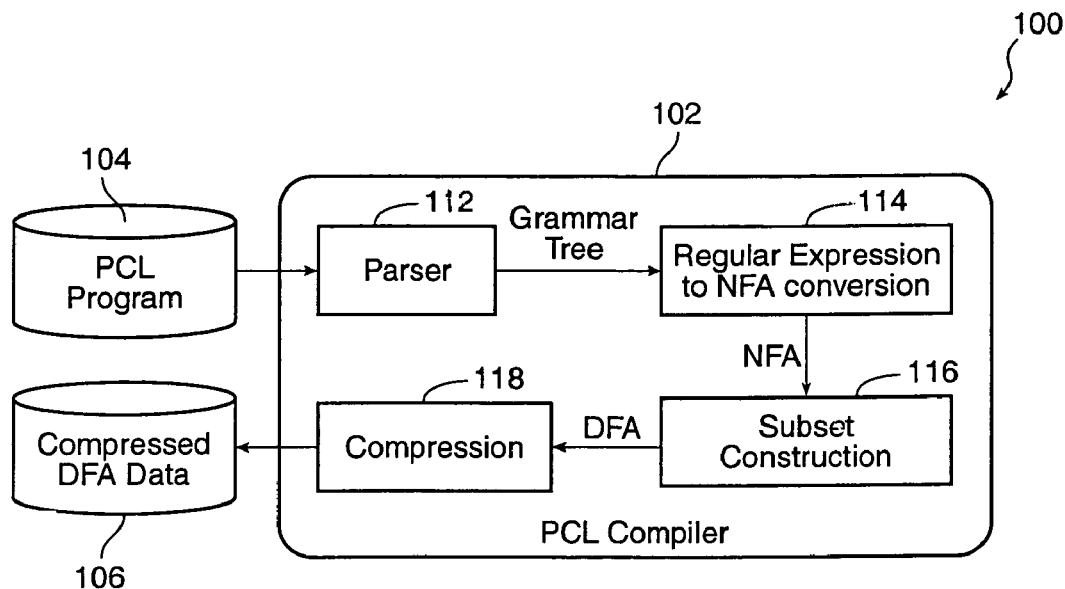
FIG. 1 is a high level overview of a PCL compiler in accordance with the present invention.

The PCL (Packet Classification Language) is a high level language according to one specific embodiment of the invention that is designed for packet class description. A packet class comprises a label that identifies the class, and a class definition that specifies the rules in regular expression notation to recognize that class. The PCL employs a UNIX-like regular expression format. A specific embodiment includes extensions to the regular expressions for convenience of specifying protocol classes and for context dependent skipping. A PCL program is a collection of these packet class definitions.

The language is defined by the following BNF (Backus-Naur Form):

| | | |
|---|---|---|
| program | → | comment (program) \| |
| | | pattern (program) \| |
| | | pattern \| |
| | | comment |
| comment | → | '#' text_line '\n' |
| pattern | → | pattern_label \n pattern_body |
| pattern_body | → | expr pattern_body \| |
| | | <blank line> pattern_body \| |
| | | expr |
| expr | → | term expr '\n' \| |
| | | term '\|' expr '\n' \| |
| | | term '\n' |
| term | → | factor '*' \| |
| | | factor '+' \| |
| | | factor '?' \| |
| | | factor { hexstr, hexstr } \| |
| | | factor {hexstr} \| |
| | | factor '^' \| |
| | | factor '{' '^' hexstr '–' hexstr'}' |
| factor | → | '(' expr ')' \| |
| | | string \| |
| | | '[' string ']' \| |
| | | '[' '~' string ']' \| |
| | | '[' hexstr '–' hexstr ']' \| |
| | | '[' '~' hexstr '–' hexstr ']' |

Table 1 below illustrates the syntax of regular expressions according to a specific embodiment of the invention, and the semantics of each. The first fifteen entries in the table include regular expression operators that are known from prior regular expression definitions. The last two entries are new regular expression operators according to the invention. These enhanced regular expression operators and additional enhanced operators are described with greater detail in the table and in the following discussion.

TABLE 1

| Expression | Matches | Example |
|---|---|---|
| Hexstring | Byte values literally | 123a4f6789 |
| "ASC string" | ASC values literally | "Apple" |
| . (period) | Any character | |
| [String] | Any character in string | [123456] |
| | | ["apple"] |
| [~string] | Any character not in string | [~123456] |
| | | [~"apple"] |
| [m–n] | Any character in the range of m to n | ['a'–'z'] |
| | | [01–55] |
| [~m–n] | Any character not in the range of m to n | [~"a"–"z"] |
| | | [~23–66] |
| Expr * | Zero or more expr's | ["apple"]* |
| Expr + | One or more expr's | 1234* |
| Expr ? | Zero or one expr's | 1234?56 |
| Expr {m} | m occurences of expr's | 12{14} |
| Expr {m–n} | m to n occurences of expr's | 12{8–15} |
| Expr1 Expr2 | Expr1 then Expr2 | 1234"apple" |
| Expr1 \| Expr2 | Expr1 or Expr2 | 8808. \| 12? |
| (Expr) | Expr | (1234) |
| {^} | Skip X number of bytes, where X is the value of the current input byte. | |
| {^Amask<shift-k} | Skip ((X &mask)<<shift-k) | |

B. PCL Compiler and DFA Compression/Decompression Algorithm

With reference to FIG. 1, a high level illustration of a PCL compiler 102 in accordance with an embodiment of the invention is shown. The PCL compiler operates according to the mechanics of a typical high-level language compiler. A PCL program 104 comprising one or more regular expressions is provided to the PCL compiler which processes the PCL program to produce a DFA 106.

The PCL program 104 feeds into a parser 112. The parser scans the input program and recognizes the grammar syntax and PCL tokens contained in the PCL program to generate an internal grammar tree data structure that represents the regular expressions in the program. Then an algorithm is used to do the regular expression reduction.

Figure 8:
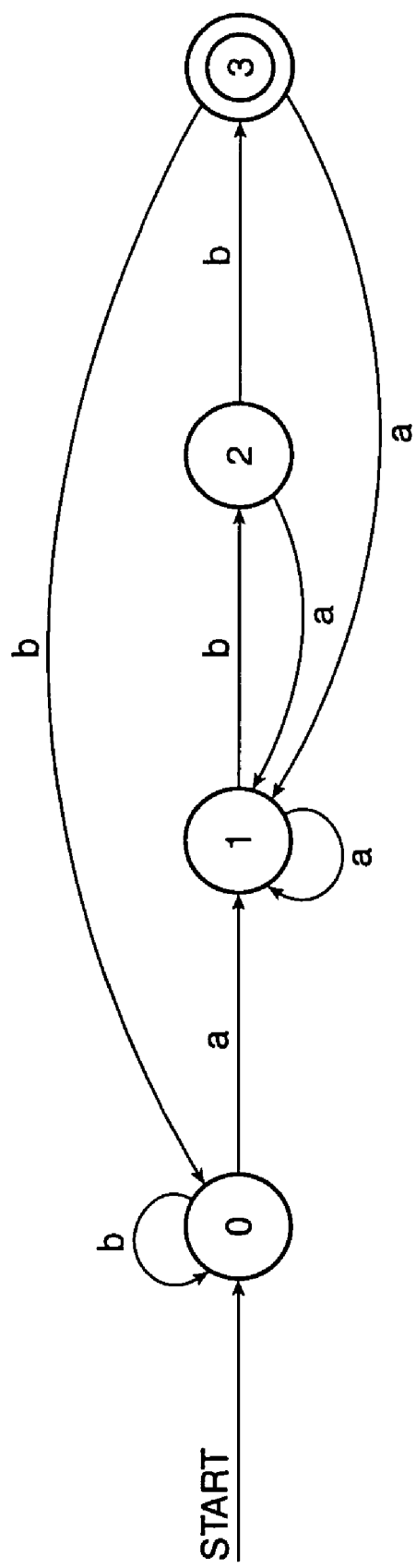
FIG. 8 is an exemplary DFA, illustrating its constituents states.

A classic NFA (non-deterministic finite automaton) generation algorithm 114 is used to convert the grammar tree into an NFA. A subset construction algorithm 116 converts the NFA into a DFA (deterministic finite automaton) transition matrix. Merely as an example, FIG. 8 shows using conventional state transition diagram notation, a 4-state DFA that recognizes strings defined by the regular expression (a|b)*abb, namely, any string that ends with 'abb' including the string "abb". Note the initial state is state 0 and the terminating state is state 3, though DFA's typically comprise more than one terminating state.

More particularly, the DFA that is produced is commonly referred to as a lexical scanner which constitutes the front-end of a conventional computer program compiler. In accordance with the present invention, the lexical scanning process scans through an incoming network data packet and produces an identification as to which class the data packet belongs. As will be explained below, an advantage of the invention is the performance increase made possible by implementing the scanner in hardware as compared to the software-based scanners of conventional computer language compilers.

In accordance with an embodiment of the present invention, a DFA of N states is represented by an N-element vector, $label_{(0 \ldots N-1)}$. Each entry in the vector label corresponds to one of the N states and includes information whether the state is a terminating state or not. If the state is a terminating state, the entry contains further information, including a class index that is associated with the terminating state. The class index indicates the matched input (i.e., the incoming data packet) as belonging to the class identified by the index. The class index determines how the packet routing device will dispose of the incoming packet. The specific actions taken depend on the type of routing or switching device. For example, a firewall filter may simply discard certain recognized packets.

A transition matrix $L_{(0 \ldots N-1, 0 \ldots 255)}$ is represented by:

$$\begin{pmatrix} L_{(0,0)} & L_{(0,1)} & \cdots & L_{(0,255)} \\ L_{(1,0)} & \cdots & & L_{(1,255)} \\ \vdots & & \ddots & \vdots \\ L_{(N-2,0)} & \cdots & & L_{(N-2,255)} \\ L_{(N-1,0)} & \cdots & & L_{(N-1,255)} \end{pmatrix},$$

where the column is selected depending on the input character y and the row is selected depending on the current state x. Hence, the matrix element $L_{(x,y)}$ represents the next state to which a transition is made, from state x, when the input character is y. Thus, each element in row x represents the set of next states for any input character.

A typical DFA transition matrix usually has many repetitive elements in each row. The reason is that a majority of next states are the same across different input characters in each state. For example, when inputting a text string, the next state is the same as the beginning state until a termination character is input. Hence, the majority of next states in a given row may be defined as a default next state. The DFA transition matrix is therefore sprinkled throughout with default next states.

A compression algorithm 118 takes advantage of the sparse nature of the transition matrix. First, the compression algorithm calculates a default next state for each row of the matrix L and saves it in an N-element vector, $default_{(0 \ldots N-1)}$. This is done by determining, for each row, which state occurs most frequently. That state then constitutes the default state for that row. The algorithm then sets, for each row, those matrix elements in the matrix L which are equal to the default value (for that row) to zero.

After this initial processing step, the matrix L now has a lot of zeros, with the remaining non-zero elements representing the non-default transitions in the diagram. The 2-D matrix is then collapsed into a more compact one-dimensional long vector, next. In this process, another N-element vector, $base_{(0 \ldots N-1)}$ holds base positions selected for each row of L. All the non-zero elements, $L_{(x,y)}$, are copied into the $next_{(base[x]+y)}$ vector, $base_{[x]}$ being the offset into the next vector of the first non-zero element in row x of transition matrix L. Each row of the transition matrix $L_{(x, 0 \ldots 255)}$ can cover a window spanning 256 elements in the next vector starting from the base address of this row: $\{next_{(base[x])} \ldots next_{(base[x]+255)}\}$. However, since only the non-default elements are copied into the next vector, many of the next vector elements in this window contain zero. Therefore, the base positions are chosen properly such that the windows for each row of data in the next vector overlap as much as possible to reduce the total length of the next vector, with the restriction that non-default elements from two different rows cannot be mapped into the same position in the next vector.

Another vector, owner, with size equal to the next vector is used to record the ownership of each entry in the next vector; i.e. which row in transition matrix L the entry belongs. Every time a non-default element $L_{(x,y)}$ is copied into a position in the next vector $next_{(z)}$, the corresponding element $owner_{(z)}$ is set to the value x, the row index of $L_{(x,y)}$.

Figure 2:
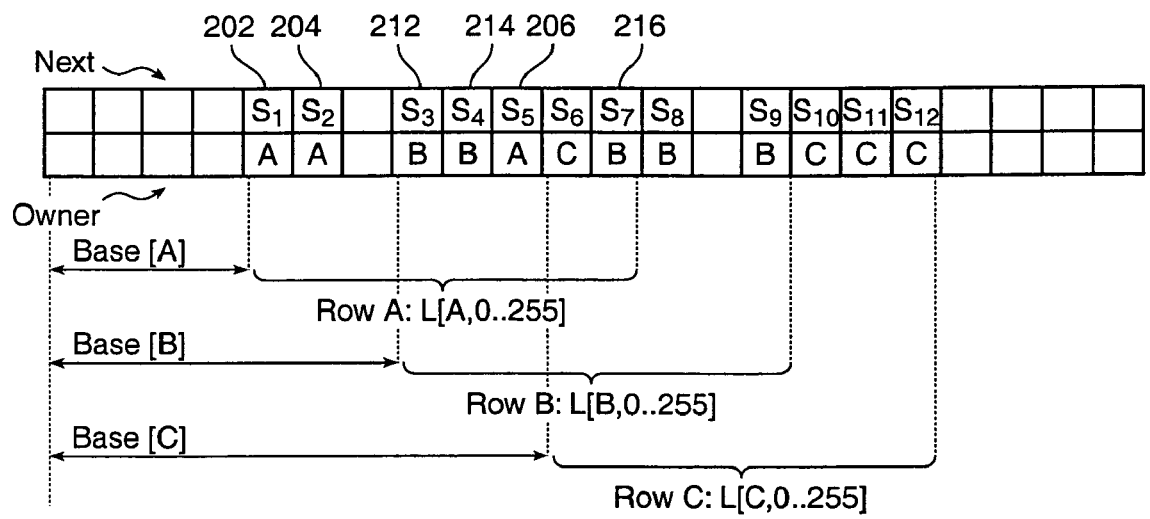
FIG. 2 is a schematic illustration of the interaction of the next, owner, and base vectors in accordance with the invention.

Referring to FIG. 2, the vectors next and owner are shown. The next vector includes the next states, $s_1, s_2, s_3$, and so on. The owner vector shows which row in matrix L each entry in vector next belongs to. Thus, entries 202–206 belong to row A, while entries 212–216 belong to row B. The base vector indicates where in the next vector the first non-default element for a given row is located. Hence, for row B, the first non-default element is located at $next_{(base[B])}$, namely, entry 212. The next non-default element in row B can be located by traversing down the owner vector beginning at $owner_{(base[B])}$ until the next entry in owner is encountered that contains the row number B, in this case, entry 214. Observe that the very next entry in vector next, entry 206, does not belong to row B, as indicated in the owner vector. This means that the next entry in row B of transition matrix L is the default state, the value for which is obtained from vector default at $default_{(base[B])}$.

The length M of the compressed vector next and vector owner, is determined by the base addresses chosen for each row. The more densely the rows overlap, the higher a compression ratio is achieved:

$$M = 256 + \text{MAX}(\text{base}_0 \ldots \text{base}_{N-1}).$$

Table 2 below is a summary of the symbols used in the description of the compression algorithm.

TABLE 2

| Symbol | Description | Size |
|---|---|---|
| N | number of states in the DFA | |
| M | size of the collapsed one-dimensional vector next and owner | |
| $L_{(0\ldots N-1, 0\ldots 255)}$ | original DFA transition matrix | N × 256 |
| $\text{label}_{(0\ldots N-1)}$ | indicates if a state is terminating state, if so which the associated class identifier | N |
| $\text{default}_{(0\ldots N-1)}$ | the default next state for each row | N |
| $\text{base}_{(0\ldots N-1)}$ | the base address for each row | N |
| $\text{next}_{(0\ldots M-1)}$ | the non-default next state | M |
| $\text{owner}_{(0\ldots M-1)}$ | the owner of each position in next, represents which row the corresponding next element belongs to | M |

An alternative, more formal description of the compression algorithm is given below, using a C-like notational format:

1. Find the default values:

```
for i=0 to N-1
    default[i] = the value with maximum number of occurrences
        among {L(i,0), L(i,1) ... L(i,255)}
2. Zero out the default elements for each row:
for i=1 to N
    for (j=0 to 255)
        if (L(i,j) ==default[i]) L(i,j) =0;
3. Clear the vectors:
for (i=0 to MAX_VECTOR_SIZE)
    next(i) =0, owner(i) =-1;
4. Align the rows to the target vector:
next_base = 0;
for (i=1 to N)
{
    not_fit =1;
    while (not_fit)
    {
        not_fit = 0;       // assuming fit trial succeed
        for (j= 0 to 255)  // tried to fit row[i] to next at next_base
        {
            if ((L(i,j) !=0) && (Owner(next—base+j) !=-1)) // collision
            {
                not_fit = 1;      // trial failed
                next_base ++;     // increment to try the next
                position break;
            }
        }
    }
    base(i) = next_base;
    for (j=0 to 255) // copy the non-zero elements of L to next
    {                // and save the row info in owner
        if (L(i,j) !=0)
        {
            next(next—base+j) = L(i,j);
            next(next—base+j) = i;
        }
    }
}
```

In general, the compression algorithm takes transition matrix $L_{(0\ldots N-1, 0\ldots 255)}$ as input, and generates the following data structures: $\text{default}_{(0\ldots N-1)}$, $\text{base}_{(0\ldots N-1)}$, $\text{next}_{(0\ldots M)}$ and $\text{owner}_{(0\ldots M)}$. The compression ratio λ is calculated by the following equation:

$$\lambda = \frac{\text{size}(\text{default}_{(0\ldots N-1)} + \text{base}_{(0\ldots N-1)} + \text{next}_{(0\ldots M-1)} + \text{owner}_{(0\ldots M-1)})}{\text{size}(L_{(0\ldots N-1, 0\ldots 255)})} = \frac{N+N+M+M}{256N} = \frac{N+M}{128N}$$

Decompression is performed to do a DFA transition matrix lookup from the compressed data structures. To calculate the value of $L_{(x,y)}$ from vectors $\text{default}_{(0\ldots N-1)}$, $\text{base}_{(0\ldots N-1)}$, $\text{next}_{(0\ldots M)}$ and $\text{owner}_{(0\ldots M)}$ for a given current state X and input character Y, the following algorithm is used:

```
Input (x, y), Output L(x,y)
1. pos = base(x)
2. if (owner(pos+y) == X)
       return (next(pos+y))
   else
       return (default(x))
```

The decompression algorithm looks up the base address for state X in the first step. Then it checks the vector entry $\text{owner}_{(pos+y)}$ to determine if next state $L_{(x,y)}$ is in the next vector. If so, the value in the vector entry $\text{next}_{(pos+y)}$ is returned; otherwise the default value for X $\text{default}_{(x)}$ is returned.

For each transition matrix decompression look up, the following operations are performed:
- one memory read operation to $\text{base}_{(x)}$
- one memory read operation to $\text{owner}_{(pos+y)}$
- one memory read operation to $\text{next}_{(pos+y)}$
- one memory read operation to $\text{default}_{(x)}$
- a comparison and selection operation Since the decompression requires five operations to do, it is very simple for hardware implementation, and satisfies the requirements for line rate processing.

C. Hardware Architecture of a Lexical Packet Classifier

A hardware classifier according to one embodiment of the invention implements a DFA that is driven by compressed data structures. The following hardware architecture assumes that several channels of time division multiplexed input packet data are presented to the classifier over a byte link input interface. The classifier generates a match indication along with the matched class identifiers.

Figure 3:
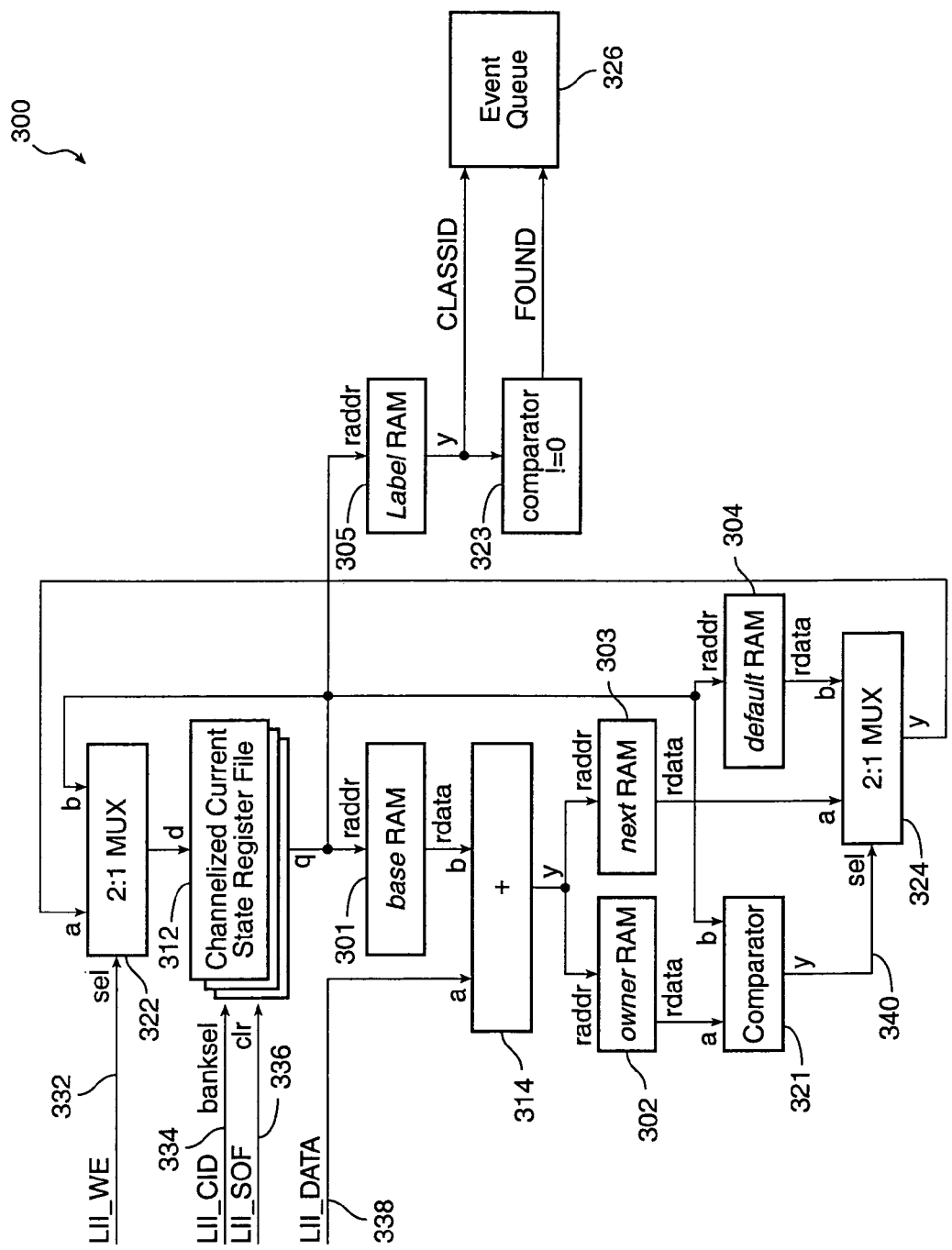
FIG. 3 is a high level block diagram of a hardware classifier in accordance with the present invention.

The general architecture of an embodiment of the hardware classifier 300 is depicted by the high level block diagram of FIG. 3. This hardware structure implements the foregoing transition matrix decompression algorithm and a multi-channel DFA token recognizer. This embodiment of the invention provides a non-pipelined structure comprising five asynchronous RAMs 301–305, a register file 312, an adder 314, and comparators 321, 323. Table 3 describes the signals used in the diagram.

TABLE 3

| Signal | I/O | Description |
|---|---|---|
| LII_SOF | Input | Indicates the start of an input frame |
| LII_CID | Input | Provide the channel index for the input data in the current cycle |
| LII_DATA | Input | Input packet data byte |
| LII_WE | Input | Data enable, asserted while the valid data is presented on LII |

TABLE 3-continued

| Signal | I/O | Description |
|---|---|---|
| FOUND | Output | Asserted when a classification match is found |
| CLASSID | Output | Provides the match class identifier |

The base RAM 301, owner RAM 302, next RAM 303, default RAM 304, and label RAM 305 are five asynchronous RAMs that are used to store the foregoing compressed DFA data structure. These RAMs are loaded with the compiled code images at system start up. The current state register file 312 provides channelized context for the DFA based on signal LII_CID 334, which indicates on which channel the input packet is arriving. There is state information corresponding to each channel.

Figure 4:
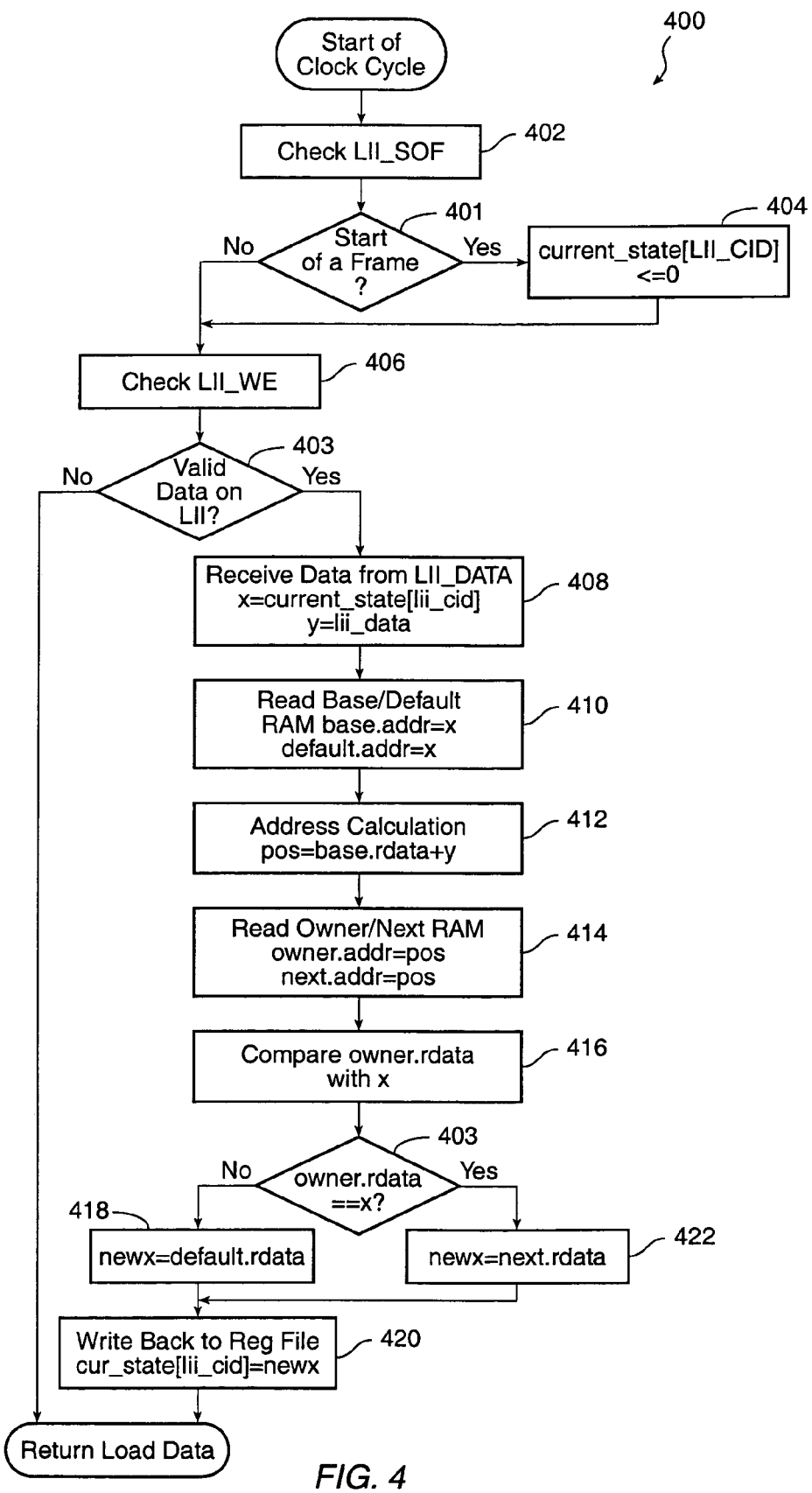
FIG. 4 is a flow chart highlighting the steps of operation of the hardware lexical classifier.

The discussion will now turn to the operation of hardware classifier 300 in connection with the flow chart of FIG. 4. The flow chart outlines the highlights of the processing which takes place in the hardware classifier. Generally, the classifier scans the input comprising a stream of data bytes which constitute incoming data packets. As each packet is recognized, by reaching a terminating state in the DFA, a class index is produced thereby identifying the scanned packet as belonging to that class. The packet is then handled according to its class index during subsequent processing by the routing device; e.g. firewall filtering, policy-based routing, and so on.

At the beginning of each clock cycle, start of frame signal 336 is checked in step 402. If a determination is made in step 401 that a new frame is available, then channel index 334 is read to select the corresponding entry in register file 312. The output of the register file represents the current state x. This feeds into base RAM 301 and serves as an index into the base RAM. Processing continues with step 406 where data enable signal 332 is read. If a determination is made that data is not available on the link input interface (LII), then the classifier simply continues to read data from the LII until the next cycle occurs.

If data is available, then processing proceeds to step 408, where data from LII is received. In step 410, the current state x feeds into the base RAM to produce an offset value at its rdata output. This offset value represents the current state (i.e., row) in the transition matrix. More particularly, the offset value represents the first column in the transition matrix. The offset value becomes an index into owner RAM 302 and next RAM 303. Step 410 corresponds to the operation pos←base$_{(x)}$. The current state x is also used to index into default RAM 304 which produces the default value (at its rdata output) associated with the current state.

Next, in step 412, the data from LII is delivered to the a input of adder 314. Here, the LII data is combined with the offset value that is produced from base RAM 301 to produce an offset position (pos) into owner RAM 302 and next RAM 303. This operation produces pos+y at the output of the adder. This offset position represents L$_{(x,y)}$ in the transition matrix, namely, the next state to which the transition occurs. Hence, in step 414, the offset value from the base RAM feeds into the owner RAM and the next RAM. The owner RAM produces a row identifier owner$_{(pos+y)}$ and the next RAM produces a next state value. The row identifier produced by the owner RAM indicates in which row (in the transition matrix) next$_{(pos+y)}$ belongs.

Steps 416 and 403 determine whether the next state value belongs to the same state (i.e., row) as the current state x. Hence, the output of owner RAM 302 is compared by comparator 321 against the current state x obtained from the state register file 312. If the next state value does not belong to the same state as the current state x, then the new state is set (step 418) to the default state value default$_{(x)}$, obtained from default RAM 304. Selector 324 is controlled to produce its b input which is then delivered to selector 322. If the next state value does belong to the same state as the current state x, then the new state is set (step 422) to the state obtained from next RAM 304. Selector 324 is controlled to produce its a input which is then delivered to selector 322. At step 420, since signal 332 is asserted, selector 322 will produce is a input which then feeds into the register file, thereby effectuating an update of the current state.

In the case where signal 332 (LII_WE) is de-asserted, meaning that no valid input data is available in the current clock cycle, the scanner 300 should remain in the current state. The selector 322 provides this by selecting its b input, which receives the current state. This action simply feeds it back to the register file thus preserving the current state.

Referring back to FIG. 3, for each cycle, the current state is also delivered to label RAM 305. The label RAM outputs CLASSID information to an event queue 326. The label RAM also outputs an indication whether the current state is a terminating state. If it is, then comparator 322 will issue a signal indicating the FOUND condition to the event queue. Otherwise, the FOUND condition is not asserted and the event queue ignores the CLASSID information. The event queue is a FIFO (first-in first-out queue) that holds the classifier results, or other events (operations) generated by the scanner.

D. Context Dependent Processing

One problem with prior art DFA-based scanning techniques is that prior art DFAs are incapable of performing context dependent recognition. A regular expression cannot define language structure such as:

$$n(x_1 x_2 \ldots x_M),$$

where an arbitrary input character n is followed by M occurrences of x and M is dependent on the input character n. Because the number of characters following n is dependent on the value of input character n, the structure is inherently context-dependent. Therefore, such sequences cannot be represented by a context free lexical rule.

Given the valid range for the value of n to be [1,N], the expression can be expanded into the static lexical expression:

$$1(x_1)|2(x_1 x_2)|3(x_1 x_2 x_2)| \ldots N(x_1 x_2 \ldots x_M).$$

While this representation can be converted into a DFA that recognizes the lexicon, the complexity of the expression, and the size of DFA quickly expands beyond the practical range as N increases.

An expression of the form above is not unusual in packet headers. For example, the IP header is a variable-length data structure, where the IHL field in the first byte of IP header is the size of IP header. Similarly, TCP headers are also variable-length.

To support recognition of these context dependent structures, the present invention in one embodiment includes enhancements to the PCL language definition, the PCL compiler, and the hardware structure. These enhancements include skip, register save, and register reference operators as outlined in Table 4.

TABLE 4

| Expression | Matches | Example |
|---|---|---|
| ^ | Skip X number of bytes, where X is the current input byte value | ^ |
| {^mask <shift − k} | Skip ((X &mask)<<shift − k), X AND'd with mask, then left-rotated by shift amount, then subtract k | {^0f<3−4} |
| {~regid=mask <shift −k} | Save the value ((X &mask)<< shift − k) into register regid | {~1=0f<3−4} |
| {~regid^} | Skip (~regid) | {~1^} |
| {~regid = ~regida operator ~regidb} | register arithmetic | {~1=~2+~3} |

These enhanced regular expression operators add context dependent processing and register file manipulation functions to the PCL language. The PCL compiler is accordingly enhanced to compile these operators into DFA instructions.

Therefore, the enhanced PCL compiler produces an additional vector: instruction$_{(0 \ldots N-1)}$ that contains the binary code for the instruction associated with each DFA state. The invention is not limited to the foregoing described instructions. Rather, this aspect of the invention lies in the association of instructions with DFA states. It should be clear that other instructions can be included, in accordance with the spirit of the invention, for any given implementation of switch or router device. Thus, a device provider can implement an appropriate instruction set for a given switching device to accommodate all possible packet processing scenarios contemplated for the device. The end-user can then define a set of policies using the enhanced regular expressions of the PCL to customize the device for her particular needs.

The classifier shown in FIG. 3 is enhanced accordingly to accommodate the DFA containing the enhanced regular expressions. Generally, each state of the enhanced DFA is associated with one or more instructions that do arithmetic on the input data, register manipulation, or skipping. For some data packets, the regular expressions used to identify them do not require the enhanced regular expressions. In those cases, the DFA states are associated with the NULL instruction. In cases where one or more enhanced regular expressions are needed to match a data packet, the DFA states will contain one or more non-NULL instructions. Thus, upon reaching a state that has one or more non-NULL instructions associated with it, the instructions are executed before making a state transition to the next DFA state.

The following examples are provided to illustrate applications of the foregoing regular expressions to typical network data packets:

1. match an IP over VLAN Ethernet Frame—

→ .{12}8100.{2}0800 ←

| | |
|---|---|
| .{12} | skip the first 12 bytes, which are DA and SA, don't care |
| 8100 | match the type field value of 0×8100, indicates VLAN |
| .{2} | skip next two bytes, which comprises VLANTAG, don't care |
| 0800 | next word is TYPE, 0×0800 indicates IP protocol |

2. match any packet containing "yahoo" within the first 40 bytes of the header—

→ .{0–35}8100"yahoo" ←

| | |
|---|---|
| .{0–35} | skip 0 to 35 occurrences of any character, until... |
| 8100 | 0×8100 is reached, and |
| "yahoo" | followed by the string "yahoo" |

3. match any TCP/UDP packet with (source_port=5) over an IP over Ethernet protocol—

→ .{12}0800{^0f<0-0}0005 ←

| | |
|---|---|
| .{12} | skip the first 12 bytes, which are DA and SA, don't care |
| 8000 | match the type field value of 0 × 8000, indicates IP packet |
| {^0f<0-0} | header_length is the lower 4 bits of ip header, this expression simply masks the next byte scanned in by 0xf to produce a value, which represents how many additional bytes will be skipped |
| 0005 | TCP/UDP source port number = 0×0005 |

4. match telnet over TCP over IP over VLAN Ethernet

→ .{12}8100...0800{~1=^0f<0-0a}.{8}06.{~1^}...17 ←

| | |
|---|---|
| .{12} | skip the first 12 bytes, which are DA and SA, don't care |
| 8100... | 0×8100 identifies VLAN |
| ... | next two bytes VLANTAG |
| 0800 | next word is TYPE, 0×0800 indicates IP protocol |
| {~1=^0f< 0-0a} | header_length is the lower 4 bit of ip header save (header_length - 0×0a) in register 1 |
| .{8} | skip 8 bytes to get to IP protocol field |
| 06 | protocol == 0×06, this identifies TCP |
| {~1^} | skip according to register 1 value to get to TCP header |
| ... | skip two-byte TCP source port number |
| 17 | TCP destination port = 0×17, identifies as TELNET protocol |

Figure 5:
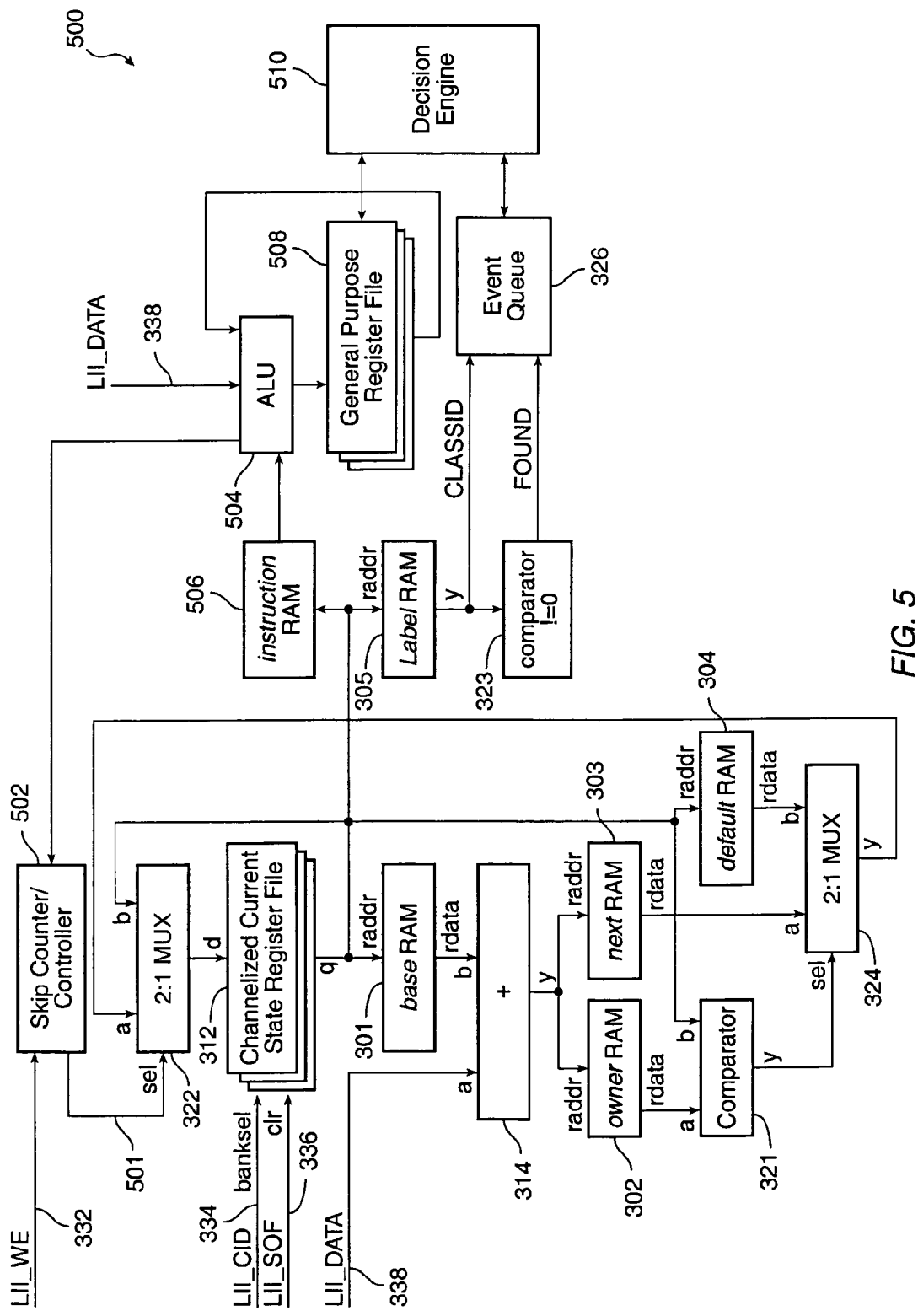
FIG. 5 is a high level block diagram of an embodiment incorporating a context dependent aspect of the hardware lexical classifier.

FIG. 5 shows the enhanced hardware architecture to handle the enhanced regular expressions. The hardware classifier 500 illustrated in FIG. 5, comprises the same as structures shown in FIG. 3. The original RAMs and DFA logic are as shown in FIG. 3. The enhanced classifier includes a skipping logic 502, an additional instruction RAM 506, an ALU (arithmetic logic unit) 504 that executes the instruction, a general purpose register file 508, and a decision engine 510.

In this embodiment of the invention, enable signal 332 feeds into skipping logic 502. The skipping logic produces a select signal 501 which feeds into selector 322. ALU 504 receives in one of its data inputs the incoming data on the link input interface lines 338.

The enhanced classifier 500 scans the input data and follows the DFA in the original way, as discussed in connection with the processing outlined in FIG. 4. In addition, the current state value x is used as an address to fetch an instruction from the instruction RAM 506. The instruction is decoded by the ALU to do either arithmetic on the input data 338 to manipulate the register file data, or to send control information to the skipping logic 502. In the case of a skip, the skipping logic skips as many subsequent input bytes as called for by the value of the current input byte. The b input to mux 322 receives the current state value. A counter (not shown) in the skipping logic counts down during a skip operation. While the counter>0, the b input is selected so that the next state is the current state. Thus, no state transitions occur when the scanning hardware is executing a skip instruction.

The ALU calculation result is either saved in register file 508, or sent to the skipping logic. The register file and the event queue are accessible by a downstream decision engine 510. This architecture allows the DFA to skip data bytes according to certain data fields in the input packet. It can also extract important data fields in the packet and provide the extracted data to the decision engine by storing the extracted data in the register file. The decision engine is essentially the rest of the switch or routing device which receives the classified packets and processes them accordingly.

F. Alternate Embodiments

According to the application requirements and the design constrains, alternative structures can be used in the implementation.

(i) Fixed Rule Protocol Classifier

Figure 6:
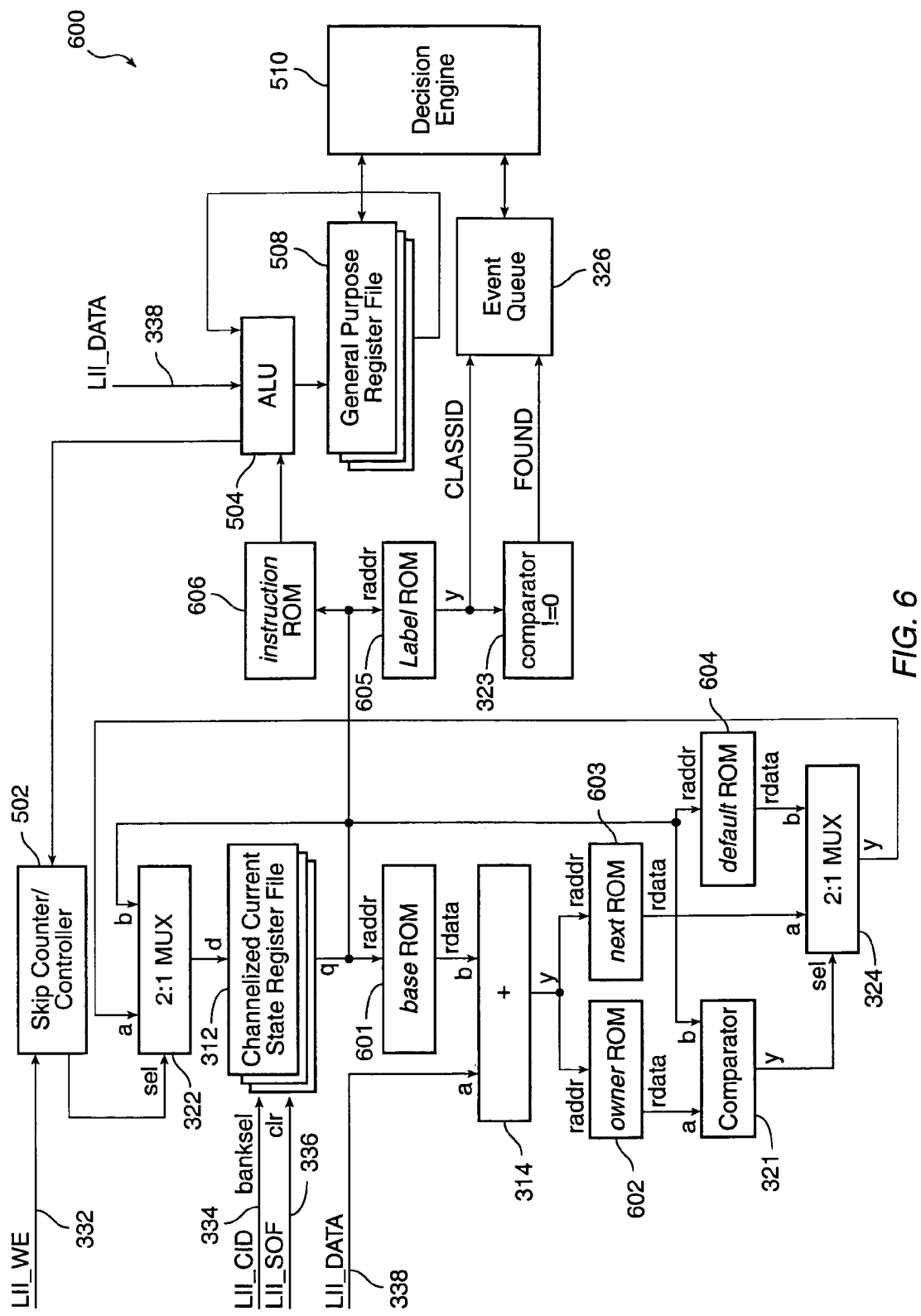
FIG. 6 is a high level block diagram of an alternate embodiment of the hardware lexical classifier.

FIG. 6 shows a ROM version of the classifier of FIGS. 3 and 5. Some applications require the packet classifier to classify a fixed set of policies. The same PCL and compiler techniques can be used to generate a compressed form of the DFA transition matrix from the policy set. The generated instruction, base, label, default, owner, and next vectors do not need to be changed, thus can be stored in lower cost ROMs. Hence, the RAMs 301–305 and 506 are replaced with ROMs 601–606.

(ii) Pipelined Implementation for High Clock Rate Application

The hardware structure in FIGS. 3, 5, and 6 can be pipelined to achieve higher clock rate and to use synchronous RAMs in the design. The pipeline structure can be optimized in various ways according to the system clock requirements, timing constrains, link input interface definitions.

(iii) Using Dual-port RAMs to Double Throughput

Figure 7:
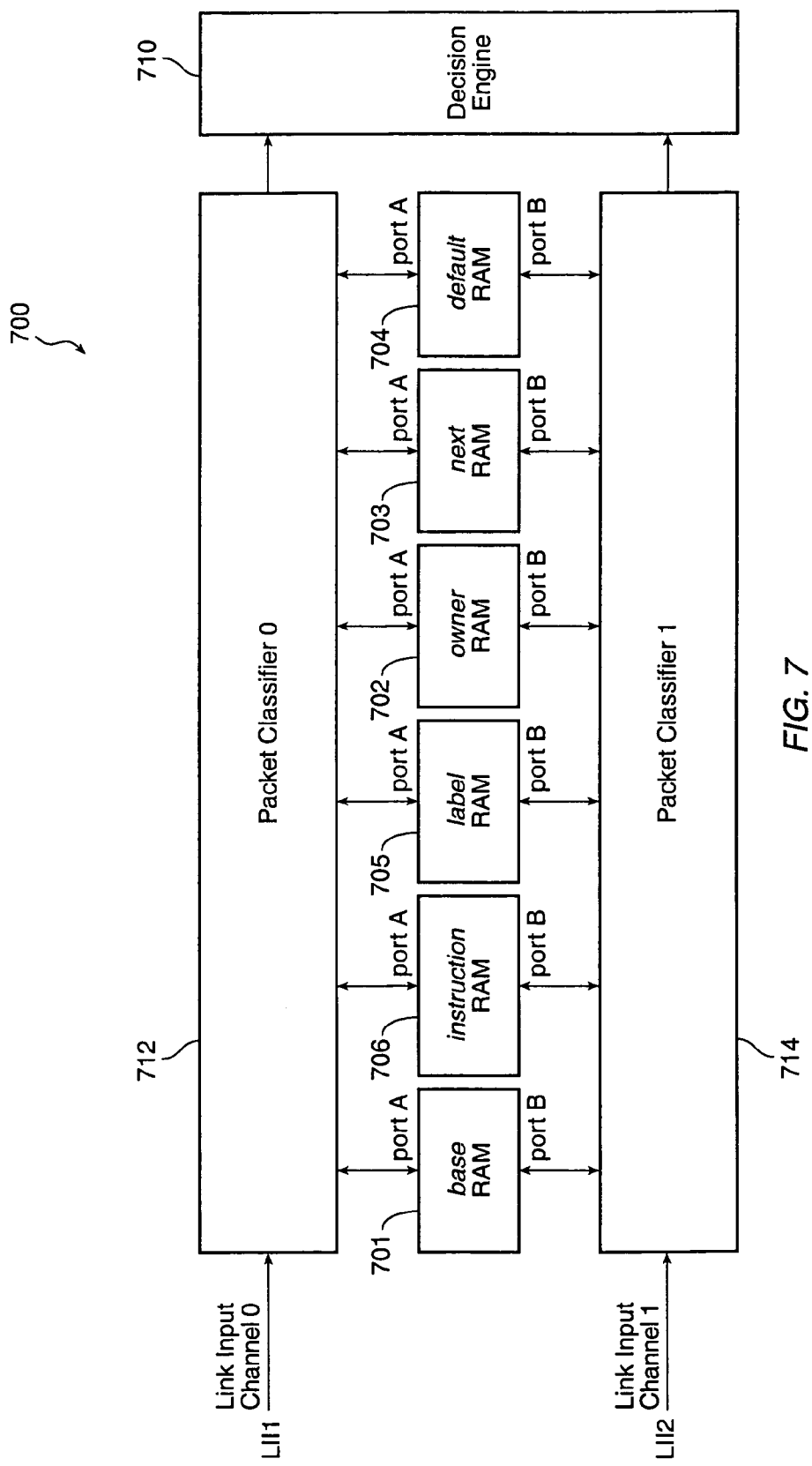
FIG. 7 is a high level block diagram of an alternate embodiment of the hardware lexical classifier.

As shown in FIG. 7, dual-port RAMs 701–706 can be used to support two independent packet classifiers. Each classifier 712, 714 is attached to one port of each RAM. Because the packet classifiers only make read accesses to the RAM from independent ports, there is no access contention problem. Hence, both classifiers can operate at full speed on independent link input channels LIl1, L112.

Accordingly, the present invention, in various specific embodiments:

Provides a versatile enhanced regular expression based PCL (Packet Classifier Language) for user policy definition. Support arbitrary class definition that is describable using a regular expression.

Concurrently matches a large number of complex rules. The maximum number of rules and complexity is only limited by the size the transition RAM size chosen in an implementation.

Includes a compiler that maps the rule set into binary code for hardware. The compiler compresses the binary code to reduce the code image size.

Provides for programmable packet classifier hardware that runs at the same clock frequency as the data word arrival rate from the network and yet sustains the line rate classification of packets. The compressed code image generated by the compiler is loaded into the RAM in the packet classifier. The hardware decompresses the code and scans the input data dynamically. The hardware can support input packet streams from several concurrent input channels.

Includes enhanced DFAs with ALU and a register file to support data context dependent skipping and field extraction operation in the classifier hardware. The skipping function is the key to supporting context dependent rules. The enhancement can significantly reduce the numbers of DFA states required to recognize variable length protocol headers.

What is claimed is:

1. A method for classifying received network data in a network device comprising:

providing a language definition comprising regular expressions;

parsing said regular expressions to identify grammatical structure among said regular expressions to produce a deterministic finite automaton (DFA); and processing incoming network data with said language definition in accordance with a formal language processing technique including scanning said network data using lexical token scanning according to said language definition, said scanning including recognizing one or more lexical tokens contained in said network data using said DFA, said DFA including a representation of said lexical tokens, said processing resulting in identification of protocol encapsulation formats in said network data.

2. The method of claim 1 wherein said scanning includes identifying an arithmetic operation and performing said arithmetic operation.

3. The method of claim 1 wherein said network data is treated as a stream of input bytes and said scanning includes identifying a skip operation and in response thereto skipping over one or more subsequent input bytes.

4. The method of claim 1 further wherein said DFA comprises plural states and said network data is organized into data packets, said step of scanning including recognizing data packets using said DFA including transitioning from one state to another.

5. The method of claim 4 wherein said data packets are variable length data packets.

6. The method of claim 5 further including generating a grammar tree data structure representative of said regular expression, producing a non-deterministic finite automaton (NFA) from said grammar tree data structure, and converting said NFA to produce said DFA.

7. The method of claim 4 wherein some of said states include one or more associated computer instructions and wherein said computer instructions are executed in connection with transitioning to a state.

8. The method of claim 7 wherein some of said states further include a skip instruction.

9. In a network data switching device, a method for classifying data packets comprising steps of:

providing a language definition in the form of one or more regular expressions, each having an associated class identifier indicative of a protocol encapsulation format;

parsing said regular expressions to identify grammatical structure among said regular expressions to produce a deterministic finite automaton (DFA), said DFA including a representation of a plurality of lexical tokens;

receiving plural data packets, each having a length not necessarily equal to one another; and for each data packet, processing said data packet in accordance with a formal language processing technique including determining a matching regular expression from among said regular expressions that matches said data packet, wherein said each data packet is classified according to the class identifier associated with said matching regular expression, said determining comprising lexical token scanning of said data packet to identify said lexical tokens using said DFA.

10. The method of claim 9 wherein said data packets comprise a data stream and said determining includes lexically scanning said data stream.

11. The method of claim 9 wherein said DFA is in compressed form.

12. The method of claim 9 further including compiling said regular expressions to produce said DFA.

13. The method of claim 12 wherein said compiling produces a non-deterministic finite automaton (NFA) as intermediate data structure, said compiling further includes converting said NFA to produce said DFA.

14. The method of claim 13 further including reducing said DFA to a compressed form.

15. The method of claim 9 wherein said data packet comprises plural bytes, and said determining includes detecting an operator indicating a number of bytes to be skipped.

16. The method of claim 15 wherein said number is specified by the value of a current input byte.

17. The method of claim 15 wherein said number is specified in a register.

18. The method of claim 15 wherein said determining further includes detecting an operator indicating a value to be saved in a register.

19. The method of claim 18 wherein said determining further includes detecting an operator indicating a logical or mathematical operation to be performed on the contents of said register.

20. In a data packet receiving and forwarding device, a method for classifying received data packets constituting a data stream, said method comprising steps of:
receiving a description of classification rules in the form of a classification language definition, said classification language definition including regular expressions;
compiling said classification language definition to produce a deterministic finite automaton (DFA) comprising plural states, including parsing said regular expressions to identify grammatical structure among said regular expressions, said DFA including a representation of a plurality of lexical tokens;
configuring a programmable hardware packet classifier with said DFA; and
receiving said data stream and processing said data stream in accordance with a formal language processing technique including scanning said data stream with said hardware packet classifier to classify said received data packets into one of a plurality of protocol encapsulation formats, said scanning comprising using said DFA to identify said lexical tokens in said data stream.

21. The method of claim 20 wherein said compiling includes associating arithmetic and logic instructions with some of said states.

22. The method of claim 20 wherein said regular expressions include arithmetic and logic operations.

23. The method of claim 22 wherein said regular expressions further include skip operations.

24. The method of claim 23 wherein said regular expressions further include data storage operations.

25. The method of claim 20 wherein said DFA is in compressed format.

26. The method of claim 20 further including:
receiving a second description of classification rules in the form of a second classification language definition;
compiling said second classification language definition to produce a second DFA;
configuring a programmable hardware packet classifier with said second DFA; and
applying said data stream to said hardware packet classifier to classify said received data packets,
wherein said data packets are classified according to said second classification rules, thereby facilitating changing packetizing policies in said data packet routing device.

27. A network data packet classifier comprising:
an input port for receiving network data packets comprising a stream of data;
a memory assemblage configured with data representing a deterministic finite automaton (DFA), said DFA produced from a language definition comprising plural regular expressions by parsing said regular expressions to identify grammatical structure among said regular expressions; and
decompression logic operatively coupled to said memory assemblage and configured to process said stream of data using said language definition in accordance with a formal language processing technique including scanning said stream of data with said DFA to find a matching one of said regular expressions,
said regular expressions having corresponding class identifiers, each class identifier corresponding to a protocol encapsulation format,
said scanning comprising using said DFA to identify lexical tokens in said stream of data, said DFA including a representation of said lexical tokens,
wherein each of said network data packets is associated with the class identifier of said regular expression that matches said each network data packet.

28. The classifier of claim 27 wherein some of said regular expressions include arithmetic instructions and logic instructions, said memory assemblage further configured to contain said instructions, the classifier further including an arithmetic logic unit operatively coupled to said decompression logic and configured to execute said instructions.

29. The classifier of claim 28 further including at least one register operatively coupled to said arithmetic logic unit, said arithmetic logic unit further configured to store data into said register in response to a save instruction.

30. The classifier of claim 28 further including skip logic operatively coupled to said logic component and configured to skip over an amount of data in response a skip instruction.

31. The classifier of claim 27 wherein said network data packets can vary from one packet to another.

32. The classifier of claim 27 wherein said DFA is in compressed form.

33. The classifier of claim 32 wherein said DFA comprises plural non-default states and plural default states, and said memory assemblage comprises a base memory, a next-state memory, and a default-state memory; said base memory configured to contain address locations of said next-state memory, said next-state memory representing all of said non-default states, said default-state memory representing all of said default states.

34. The classifier of claim 33 wherein said memories are random access memories.

35. The classifier of claim 33 wherein said memories are read-only memories.

36. A network data packet classifier comprising:
an input configured to provide a data packet comprising a stream of data;
a first system of memory configured with data representing a deterministic finite automaton (DFA), said DFA defined in accordance with a language definition comprising a set of regular expressions and produced by parsing said set of regular expressions to identify grammatical structure among said regular expressions, said DFA comprising plural states including an initial state and plural terminating states;

a system of logic circuits operatively coupled to said first system of memory and to said input, and configured to process said stream of data using said language definition in accordance with a formal language processing technique including a step to lexically scan said data stream with said DFA to produce a reached terminating state which corresponds to recognition of a lexical token; and a second system of memory configured with data representing a class index corresponding to each of said terminating states and configured to output a class index in response to the production of said reached terminating state, said class index corresponding to a protocol encapsulation format.

37. The classifier of claim 36 further including a third system of memory configured to contain current state information for plural input channels, said system of logic circuits operatively coupled to said third system of memory to initialize said DFA in accordance with current state information corresponding to the input channel associated with said data packet.

38. The classifier of claim 36 wherein some of said states have one or more associated instructions, the classifier further including an arithmetic logic unit operatively coupled to said system of logic circuits and configured to execute said instructions.

39. The classifier of claim 38 further including at least one register operatively coupled to said arithmetic logic unit, said arithmetic logic unit further configured to store data into said register in response to a save instruction.

40. The classifier of claim 38 further including skip logic operatively coupled to said logic component and configured to skip over an amount of data in response a skip instruction.

41. The classifier of claim 36 wherein said stream of data is a stream of bytes.

42. The classifier of claim 36 wherein said data packets vary from one packet to another.

43. A network packet classifier comprising:
   means for receiving an incoming network packet;
   means for processing said network packet in using a language definition in accordance with a formal language processing technique including means for classifying said network packet by matching the pattern of constituent data of said network packet against plural regular expressions, each regular expression having a corresponding class identifier; and
   means for outputting a class identifier of the regular expression which matches said network packet, said class identifier corresponding to a protocol encapsulation format,
   said means for classifying including means for lexical token scanning to recognize one or more lexical tokens in said network packet using a deterministic finite automaton (DFA), said DFA including a representation of said one or more lexical tokens, said DFA produced by parsing said regular expressions to identify grammatical structure among said regular expressions.

44. The classifier of claim 43 wherein said means for classifying includes a memory component configured with data to represent said DFA.

45. The classifier of claim 44 wherein said means for outputting includes a second memory component configured with said class identifiers.

46. The classifier of claim 43 wherein said regular expressions include arithmetic specifiers and said means for classifying includes an arithmetic logic unit configured to perform operations in accordance with said arithmetic specifiers.

47. A network packet classifier comprising:
   a dual-ported memory component;
   first classification logic operatively coupled to a first port of said dual-ported memory component and having a first input for receiving a data stream; and
   second classification logic operatively coupled to a second port of said dual-ported memory component and having a second input for receiving a data stream,
   said memory component configured to contain a deterministic finite automaton (DFA) representative of a language definition and comprising plural states,
   said DFA representing plural regular expressions of said language definition for matching data packets and produced by parsing said regular expressions to identify grammatical structure among said regular expressions,
   said first and second classification logic each configured to process an associated data stream using said language definition according to a formal language processing technique including a step to scan said associated data stream using said DFA to identify data packets contained therein using said DFA to perform lexical token scanning of said data packets to produce plural lexical tokens, said DFA including a representation of said lexical tokens to classify identified data packets into one of a plurality of protocol encapsulation formats.

48. The classifier of claim 47 wherein said data packets are characterized in being variable in length.

49. The classifier of claim 47 wherein said regular expressions include arithmetic and logic operators.

50. The classifier of claim 47 wherein said regular expressions include a skip operator.

* * * * *